United States Patent
TeWinkle

(10) Patent No.: US 7,164,506 B2
(45) Date of Patent: Jan. 16, 2007

(54) MULTI-CHIP IMAGE SENSOR, ON CHIP APPARATUS FOR CAUSING EACH CHIP TO SELECTABLY FUNCTION IN A PARALLEL OR SERIAL READOUT

(75) Inventor: Scott L. TeWinkle, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 880 days.

(21) Appl. No.: 10/165,713

(22) Filed: Jun. 7, 2002

(65) Prior Publication Data

US 2003/0227656 A1 Dec. 11, 2003

(51) Int. Cl.
 *H04N 1/04* (2006.01)
(52) U.S. Cl. ............... 358/474; 358/513; 358/514; 347/247; 347/237; 348/311; 348/300
(58) Field of Classification Search ............... 358/505, 358/513, 514, 530, 482, 483; 347/247, 237, 347/257; 348/311, 300
See application file for complete search history.

(56) References Cited

U.S. PATENT DOCUMENTS

| | | | | |
|---|---|---|---|---|
| 4,567,529 A * | 1/1986 | Yamaguchi et al. | ........ | 358/482 |
| 4,691,114 A * | 9/1987 | Hasegawa et al. | .......... | 358/474 |
| 4,737,854 A * | 4/1988 | Tandon et al. | ............. | 358/482 |
| 4,940,325 A * | 7/1990 | Becker-Ross et al. | ...... | 356/328 |
| 4,999,077 A * | 3/1991 | Drake et al. | ................. | 156/299 |
| 5,160,945 A * | 11/1992 | Drake | ......................... | 347/42 |
| 5,528,272 A | 6/1996 | Quinn et al. | .................. | 347/42 |
| 6,014,160 A | 1/2000 | Tewinkle et al. | ........... | 347/247 |
| 6,133,952 A * | 10/2000 | Tewinkle et al. | ........... | 348/246 |
| 7,042,491 B1 * | 5/2006 | Saito et al. | ................. | 348/139 |

* cited by examiner

Primary Examiner—Douglas Q. Tran
Assistant Examiner—Negussie Worku
(74) Attorney, Agent, or Firm—R. Hutter

(57) ABSTRACT

In a photosensitive imaging apparatus having multiple chips, each chip having a set of photosensors, chips of a single basic design can be instructed to operate consistently with either parallel or serial readout of the apparatus. Signals on a shift register line associated with each chip are recognized, by on-chip circuitry, as an instruction to operate the chip in either a parallel or a serial manner.

7 Claims, 8 Drawing Sheets

FIG. 5 PRIOR ART
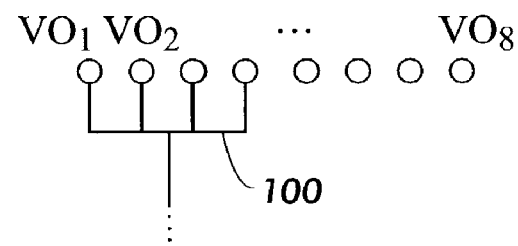
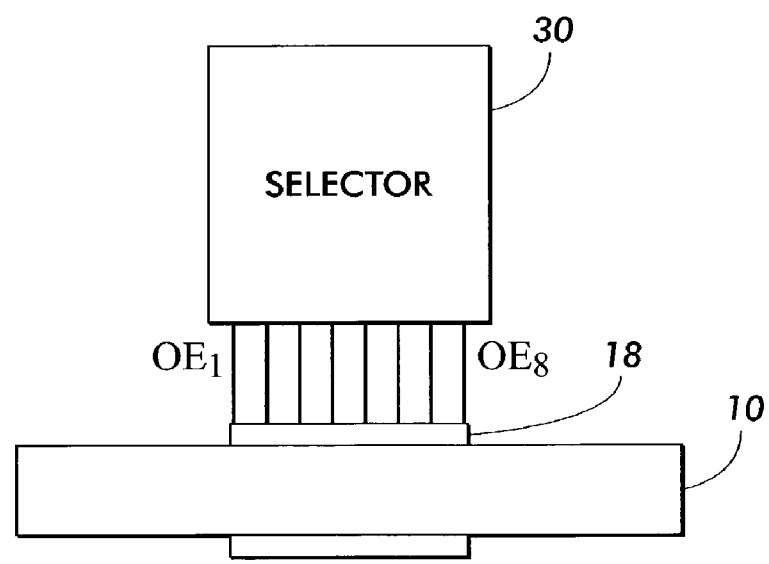
FIG. 6
PRIOR ART

MULTI-CHIP IMAGE SENSOR, ON CHIP APPARATUS FOR CAUSING EACH CHIP TO SELECTABLY FUNCTION IN A PARALLEL OR SERIAL READOUT

TECHNICAL FIELD

The present invention relates to scanning arrays in which a set of photosensors are arranged in a linear array, such as for scanning of hard copy images for conversion to digital data. More specifically, the present invention relates to scanning arrays in which a plurality of silicon chips are butted to form a single linear array of photosensors.

BACKGROUND

Image sensor arrays typically comprise a linear array of photosensors which raster scan an image-bearing document and convert the microscopic image areas viewed by each photosensor to video image signals. Following an integration period, the image signal charges formed on the photosensors are amplified and transferred as analog video signals to a common output line or bus through successively actuated multiplexing transistors.

For high-performance image sensor arrays, a preferred design includes an array of photosensors of a width comparable to the width of a page being scanned, to permit imaging generally without the use of reductive optics. In order to provide such a "full-width" array, however, relatively large silicon structures must be used to define the large number of photosensors. A preferred technique to create such a large array is to make the array out of several butted silicon chips. In one design, an array is intended to be made of twenty silicon chips, butted end-to-end, each chip having 248 active photosensors spaced at 400 photosensors per inch. Typically, the chips which are butted to form the array are formed in a silicon wafer, which is then "diced" into a number of chips, which are individually tested and then arranged into a bar shape.

In a sensor array of this design, each of the chips is a separate integrated circuit. Typically, each chip has its own individual video output, for the downloading of image signals ultimately from the photosensors on that particular chip. When an image is being scanned, video signals are output from each chip at a very high rate as the original hard-copy image moves past the linear array of photosensors on the chip. Thus, if the intended resolution of the chip in a bar is 400 spots per inch, a line of video data must be output from the chip every time the original image moves 1/400th of an inch. For this reason, in a bar with up to twenty chips, high-speed handling of the resulting video data becomes an important design consideration for downstream circuitry.

A key factor in designing circuitry downstream of such an image sensor array is how many parallel channels of digital data the circuitry is designed to accept. The outputs of many chips can be coordinated to output their video signals on to a single video line for all chips; conversely a large number of chips can each simultaneously output their video data in parallel. Of course, other designs may compromise between series and parallel outputs, such as combining the outputs of twenty chips into 2, 4, 5, 10 or 20 output lines. In general, the larger the number of chips grouped into a single output channel, the slower the maximum possible scan rate for the array. Conversely, the smaller the number of chips grouped into one output channel, the higher the maximum possible scan rate. Of course, whether the output is highly parallel or highly in series may introduce costs to the design, either in hardware or in performance. Therefore, it is desirable to provide an image sensor bar that can be electronically configured, so that a bar of a single design can be made to output as few or as many parallel channels as needed.

DESCRIPTION OF THE PRIOR ART

U.S. Pat. No. 4,737,854 discloses a basic design of a CMOS-type image sensor array in which a number of chips are butted together to form a single linear array. In this design, each chip includes a linear array of photosensors, each photosensor leading into a two-stage transfer circuit, the transfer circuits in turn selectively outputting signals thereon to a single video output line.

U.S. Pat. No. 5,528,272 discloses the general design of an image sensor array in which a large number of image sensor chips are butted to form a single array and mounted on a substrate. The substrate includes printed circuitry thereon, which connects the various chips to a central socket.

U.S. Pat. No. 6,014,160 discloses a multi-chip scanning bar in which each chip is selectably actuable to allow a "floating" output line; this feature facilitates a basic hardware design of a bar to be operated with serial or parallel output from any subset of chips, based purely on real-time inputs to the chips.

SUMMARY OF THE INVENTION

According to one aspect of the present invention, there is provided a photosensitive apparatus, comprising a plurality of photosensors, an output line, and a shift register line for accepting signals over time. A shift register causes an output of signals from the photosensors onto the output line as a result of signals on the shift register line. Readout control means recognize a instruction signal and read out signals on the output line in one of a parallel manner or a serial manner in response to said instruction signal.

BRIEF DESCRIPTION OF THE DRAWINGS

FIGS. 3–5 are examples of output channel configurations for downstream circuitry relative to the sensor bar of the present invention.

FIG. 6 is a simplified diagram showing the interaction of lines associated with a sensor bar.

DETAILED DESCRIPTION

Figure 1:
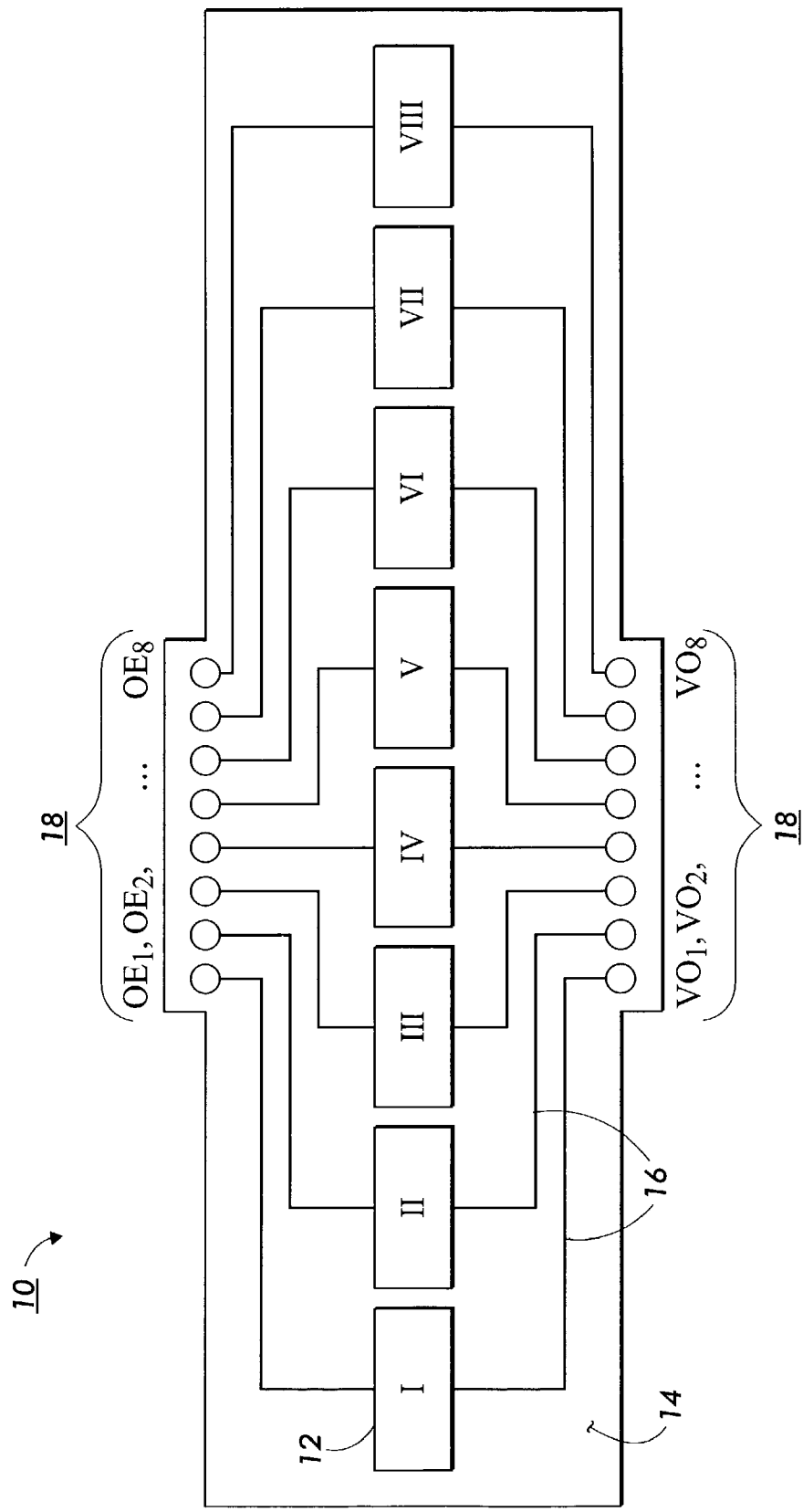
FIG. 1 is a plan view of a sensor bar, including a plurality of butted photosensor chips.

FIG. 1 is a plan view of an image sensor bar. The bar, generally indicated as 10, includes a plurality of image sensor array chips 12 that are butted end-to-end so that the arrays of photosensors on each chip (not shown in FIG. 1)

together form a single linear array of photosensors. The chips 12 are mounted on a substrate 14. In FIG. 1, for purposes of clarity, the individual chips forming the butted array are given roman numerals I–VIII. As further can be seen in the Figure, each chip 12 includes at least two particular connections, an "output enable" connection OE, and a "video out" connection VO. As shown in the Figure, for example, the chip marked I connects to an output enable line OE1 and a video out line $VO_1$, and so forth. For clarity, in this embodiment, the OE connections are shown connected to one edge of each chip while the VO connections are connected to the other, but it will be apparent that such connections could be made to any portion of a chip depending on a particular design of the chip. The connections such as indicated by 16 between the chip and the edge of the substrate 14 can be made, for example, using known printed-circuit techniques or any equivalent known in the art.

It will further be seen that the various OE and VO lines are connected to occupy a relatively small portion of one or another edge of the substrate 14: as shown here, the various VO and OE connections are brought in close proximity so that they may be connected to a removably-connectable socket, such as indicated generally by 18, of a design which is known in the art. Reference may be made to U.S. Pat. No. 5,528,272, referenced above, for the typical appearance of a more practical version of the present embodiment. Of course, the various OE connections and the VO connections could ultimately be connected to a single socket 18, although separate sockets 18 are here shown for clarity.

Figure 2:
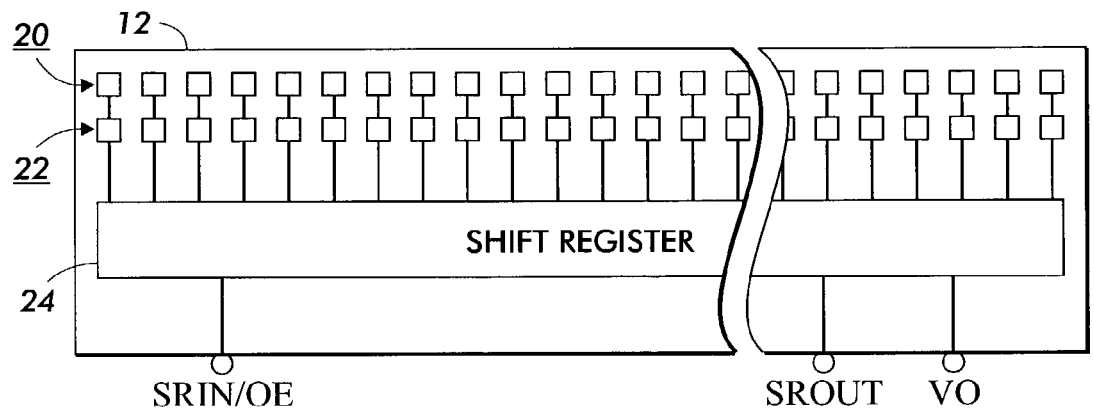
FIG. 2 is a simplified plan view showing the essential elements of a photosensor chip as would be used with the present invention.

FIG. 2 is a simplified diagram showing a typical configuration of a chip 12 as would be included on a bar such as 10. The chip 12 includes at least one row 20 of photosensors arranged in a linear array that extends substantially across the entire length of the chip. As is well known, a monochrome chip 12 will typically have only one linear array of photosensors, while a full-color version will typically have three parallel linear arrays of photosensors, each array being sensitive, such as by the inclusion of a color filter layer, to one primary color. The linear array 20 must extend essentially across the entire width of the chip 10, so that a number of chips, butted end-to-end, will form a single linear array of photosensors.

With continuing reference to FIG. 2, each photosensor in linear array 20 is connected, in this embodiment, to a transfer circuit 22, that in turn either connects to or is controlled by a shift register 24. For a more detailed implementation of a chip of this type, reference is made to U.S. Pat. No. 4,137,854 referenced above. In a CMOS-type chip, a shift register 24 is typically used to cause the transfer circuits 22 to transfer image-related charges from the photosensors 20 onto a video output line, while in a CCD-type chip, the individual cells of the shift register 24 shift the image-based signal charges out of the chip.

For purposes of the present invention, chip 12 includes an "shift register in" or "output enable" input line SRIN/OE which connects to the shift register 24 and, when activated, causes the shift register 24 to sequentially output the image-related charges on photosensors 20 to the video out line VO. Equivalents of the output enable line OE will be apparent in just about any type of photosensor chip, whether of the CMOS or CCD variety. What is important is that, when a signal is entered on to the OE line, in response thereto, the image signals are output on video out line VO. When the OE line is in the form of an input to a shift register to create an SRIN/OE line, as in this embodiment, the SRIN/OE line accepts a short pulse, in effect a digital "1," which moves through the stages of the shift register 24, typically in coordination with regular pixel clock signals, as will be described in detail below. As the digital 1 moves through the stages of the shift register 24, the transfer circuit 22 associated with each stage is caused to output its signal (from its corresponding photosensor 20) onto the video out line VO, thus reading out the image signals across the chip 12. At the end of the shift register, the digital "1" appears as a pulse on the shift register out line SROUT.

Figure 3:
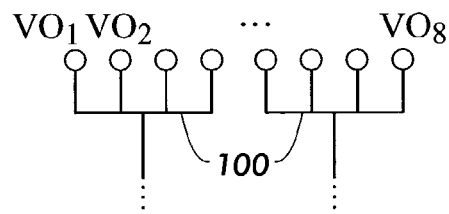
Figure 4:
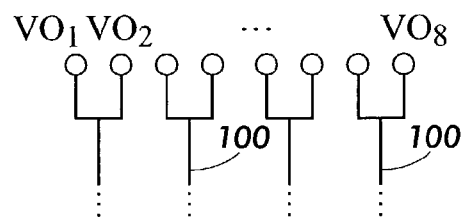

An essential feature of the bar 10 in FIG. 1 is that for each individual chip the VO and OE lines are directly accessible right off the bar 10, through one or more sockets 18. With reference to the video out lines $VO_1$, $VO_2$, ... $VO_8$, it is physically possible for circuitry associated with these outputs to accept the video outputs of each and any individual chip 12 directly. In a practical situation, however, it would be typically more desirable to have fewer than eight parallel channels for video output. FIGS. 3–5 give examples of how the video outputs $VO_1$, $VO_2$ ... $VO_8$ can be in effect pared down to a fewer number of lines by wiring in the form of hard-wired buses indicated as output channels 100. In FIG. 3, for example, the eight video output lines are tied together in two groups of four; in FIG. 4, the eight lines are grouped in four groups of two lines each, and in FIG. 5, a configuration which may be desirable in certain circumstances, only four lines are connected to downstream circuitry, with the outputs of the other four chips not being used at all. (Another possible configuration could be to tap the VO lines only of an evenly-distributed subset of chips 12, such as every other chip in the array.) What is significant is that the circuitry which determines how many parallel channels of video output are available can exist off the bar 10 entirely, while the bar 10 is of a generalized design which is indifferent to how many video output channels the downstream circuitry requires.

Once it is determined specifically how many output channels are required by the downstream circuitry, such as in a digital copier or facsimile machine, the suitable outputs from the video lines can be manipulated to yield the desired number of parallel channels by deliberate sequencing of signals to the output enable lines OE. FIG. 6 is a simplified diagram showing the interaction of the OE lines on a bar 10 with what is here called a "selector" indicated as 30. The selector may be ultimately related to a microprocessor or CPU, or more typically, could be in the form of an ASIC suitable for this purpose. As can be seen, the selector 30 includes as outputs one line for each chip in the bar 10 and can, at predetermined times, output a digital "1" to one or another output enable line OE; it is also possible for the selector 30 to transfer an SROUT line from one chip to the SRIN/OE line of another chip. It can thus be seen that, by selecting the kind and sequence of signals from selector 30 to the output enable lines OE, the total output of the bar 10 can be made suitable for any particular downstream circuitry, such as shown in FIGS. 3–5. Significantly, such an arrangement facilitates adapting a single basic hardware design of bar 10 to output image signals in any desired parallel, serial, or hybrid manner (that is, within a subset of chips having a common output line, the output will be serial, but among the several subsets that may make up a complete bar 10, the outputs are parallel).

Figure 7:
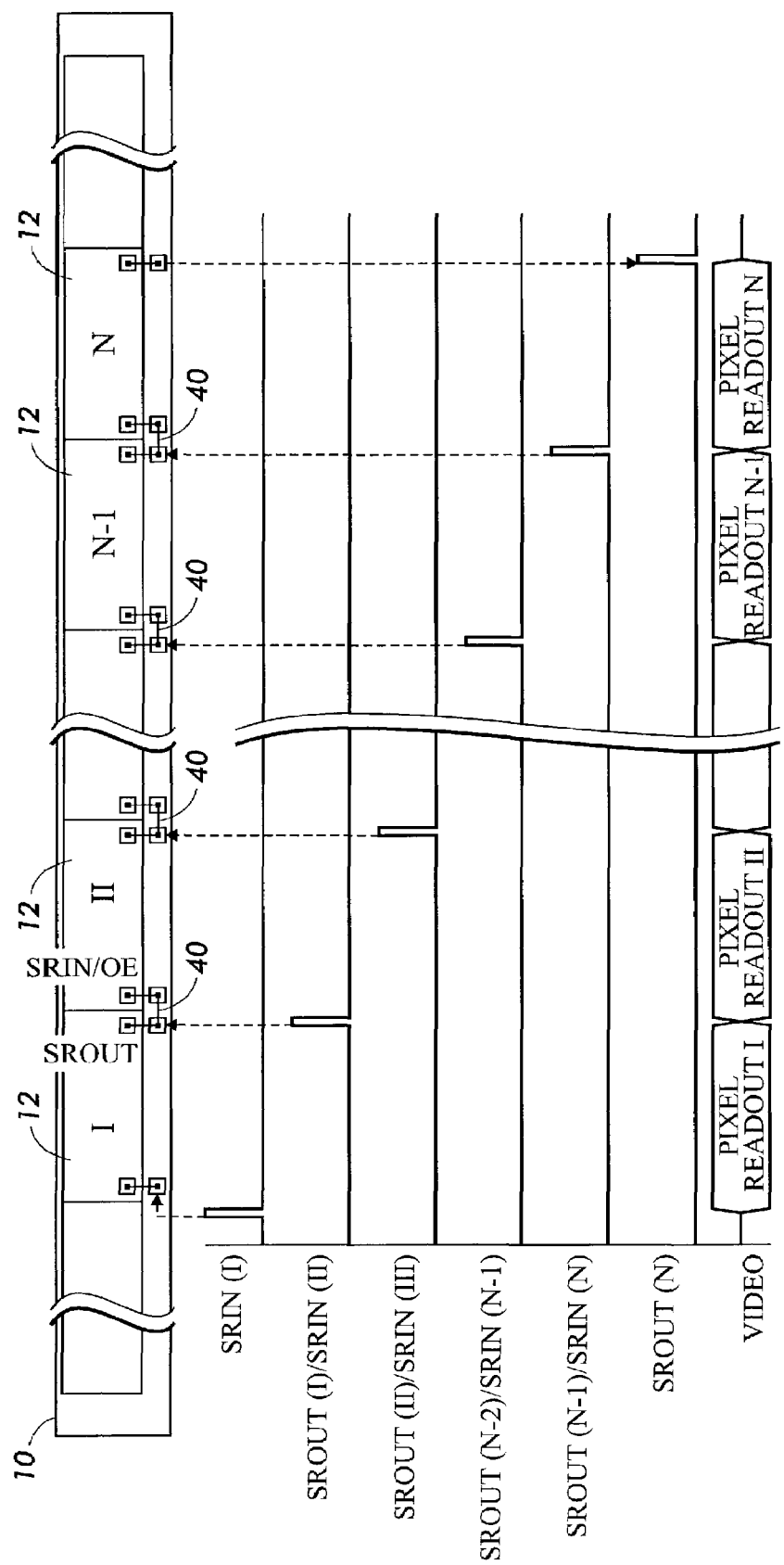
FIGS. 7 and 8 are respective plan views of a subset of chips on a bar 10, in combination with a set of signals over time in each case, showing a principle of operation relevant to the present invention.
Figure 8:
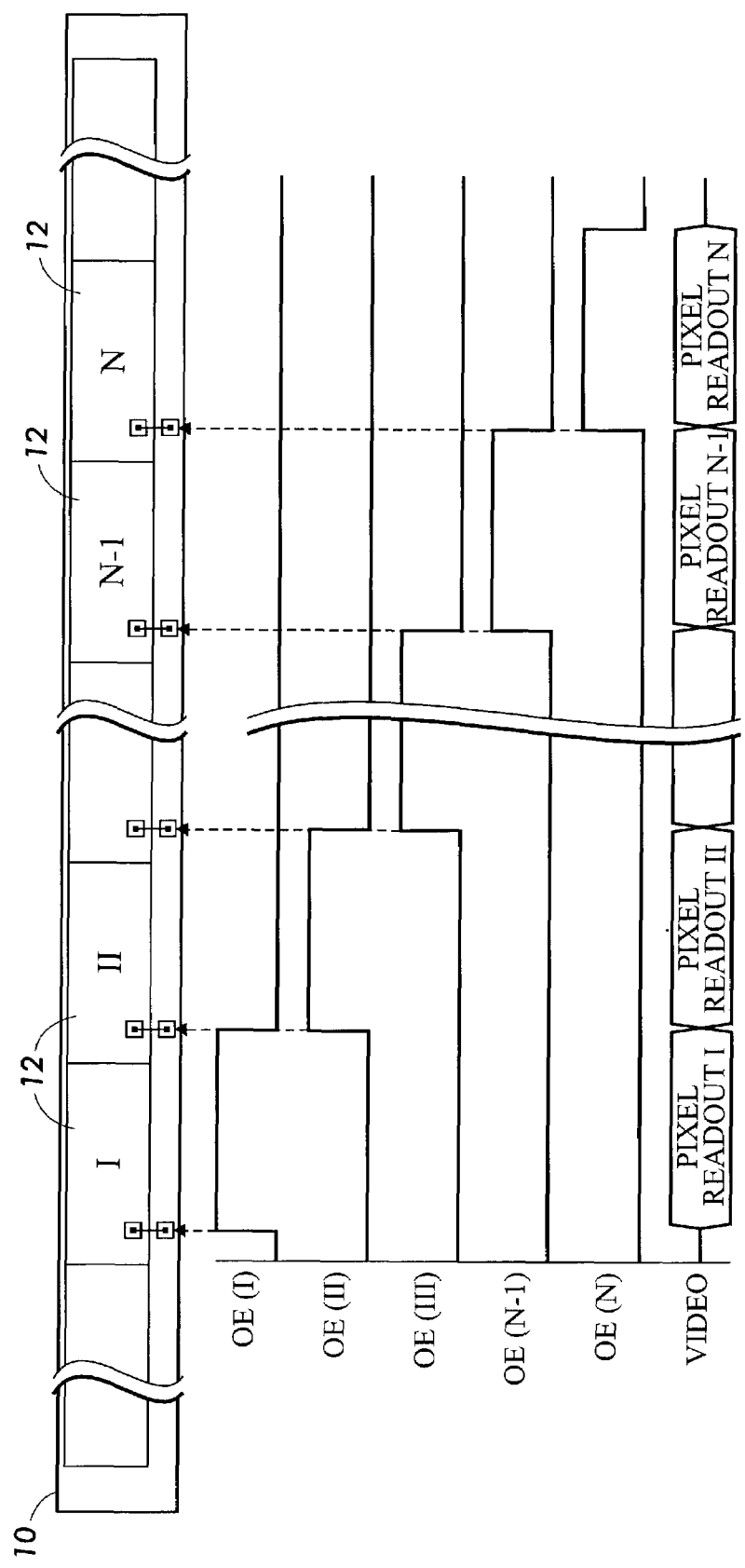

FIGS. 7 and 8 are respective plan views of a set or subset of chips 10, identified individually as I–N on a bar 10, in combination with a set of signals over time in each case, showing a principle of operation relevant to the present invention. In the FIG. 7 embodiment, the subset of chips 12 are configured to output video data in a single serial stream;

while in FIG. 8, the subset of chips 12 are each intended to output their respective video data in separate parallel channels.

Looking first at the serial output system of FIG. 7, if it is assumed that the subset of chips I–N output onto a common output line, it can be seen that the SROUT line for each chip is connected to form the SRIN/OE line of the adjacent chip within the subset. In this way, the digital "1" that moves along a shift register to cause a serial output from the set of photosensors within a single chip just continues its "motion" onto the next chip, so that the subset of chips I–N in effect acts as one large chip with a single shift register.

According to one embodiment, given a particular circuit design of each chip, the "handoff" of the digital 1 from the shift register of one chip to the next is characterized by a brief pulse on the SROUT line of the first chip becoming the first SRIN signal on the next chip, as shown in the signal forms in the Figure. (The handoff can be accomplished either through a direct wire connection, as shown as 40 in FIG. 7, or through a larger system such as including selector 30 in FIG. 6.)

Looking at the parallel output system of FIG. 8, the interconnection of shift registers between chips such as shown in FIG. 7 is not apparent: rather, each chip (or subset of photosensors) operates as if other chips did not exist, and is merely instructed to output its whole output line at a particular time. In order to assemble a full-width readout of video data from a bar comprising a plurality of parallel chips (or parallel subsets of chips), the SRIN/OE line associated with each chip is activated in sequence across the bar, as shown in the signal forms in the Figure. In this embodiment, each chip or subset of chips is assigned its own, independent OE line. For each chip, the OE line is raised high long enough for the whole array of photosensors on each chip to read out, and is then dropped, effectively turning that chip "off." Essentially immediately thereafter, the signal on the SRIN/OE line for the next chip in the order is raised, once again long enough for the full set of photosensors to read out, in a series that in effect moves across the bar, as shown.

To summarize the two modes of operation, with a serial readout, the shift register lines of the chips are connected, and the handoff of readouts between chips is characterized by a short pulse; with a parallel readout, each chip, which is independently controllable, is effectively turned on in a predetermined time window, with the SRIN/OE line for each chip being raised high for a relatively extended period of time.

From the perspective of an individual chip 12, in a bar or array 10 which is designed or operated in a certain way, it is useful to "know" whether the chip is being operated in a parallel or serial manner. If the chip is of a design that, by itself, can be operated either way, a provision must be made by which the chip in effect receives instructions as to whether it is to operate as a part of a serial readout arrangement, or whether it is operating as part of a parallel readout. As mentioned above, with the present embodiment, a serial readout arrangement requires that the input signal on the SRIN/OE input of the chip be simply a relatively brief pulse, basically consistent with the behavior of a digital 1 on the shift register of the chip; in a parallel arrangement, the input signal stays high significantly longer. In the present embodiment, the individual chip is instructed whether it is receiving a pulse or an extended input signal, and then can react accordingly.

Figure 9:
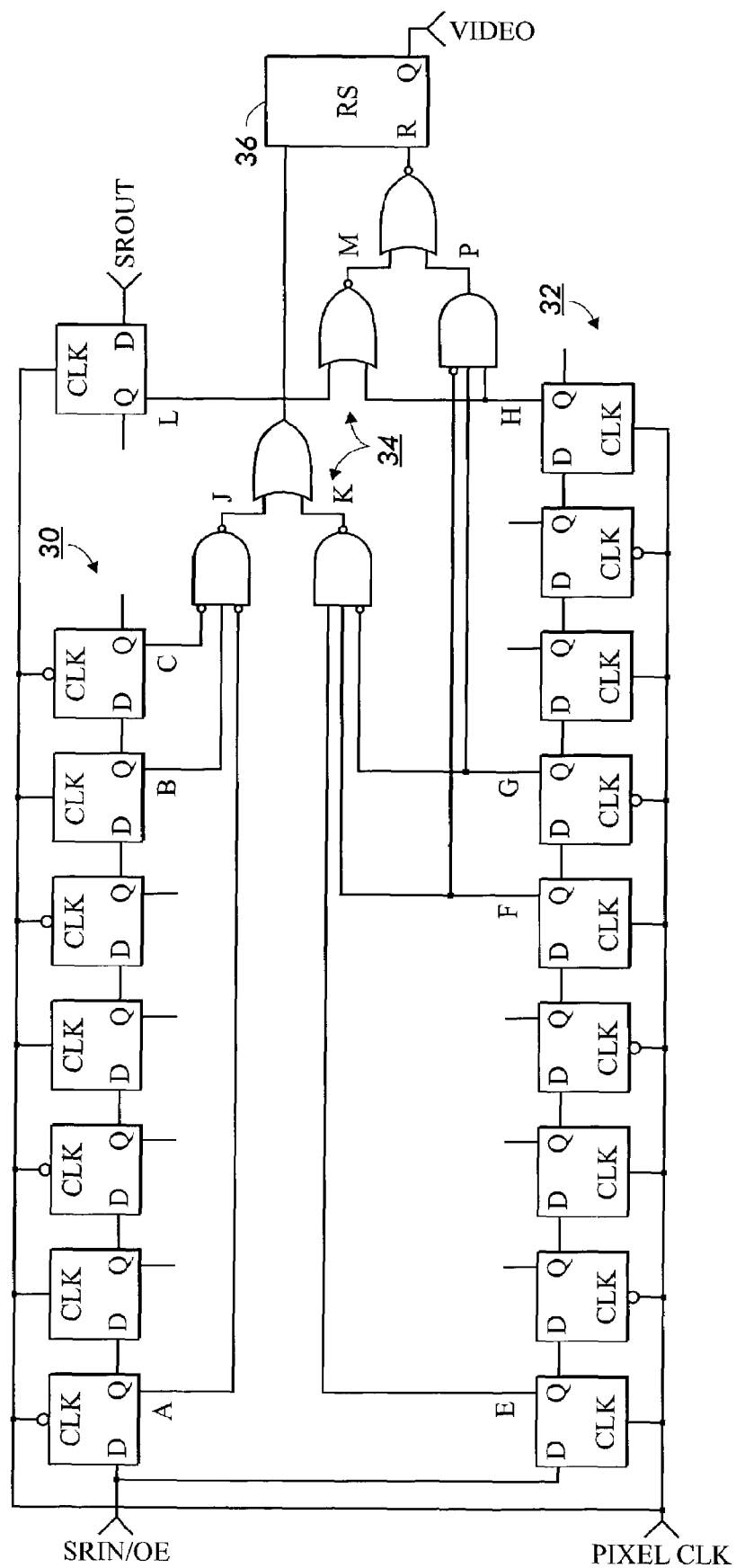
FIG. 9 is a schematic of a set of on-chip circuitry by which an individual photosensor chip can receive instruction to operate in a serial or parallel manner.

FIG. 9 is a schematic of a set of on-chip circuitry by which an individual photosensor chip such as shown as 12 above can receive instruction as to whether, at any given time, it should operate in a "serial" or "parallel" manner. In the present embodiment, the two types of "instructions" are characterized by the duration of a high condition on the SRIN/OE line for the chip: significantly, in the embodiment, there is no other data input channel except the single SRIN/OE line for the instruction.

For purposes of the present embodiment, there is associated with the pin or contact on a chip 12 for receiving the SRIN/OE inputs two parallel sets of flip-flops, here indicated as 30 and 32. Each set of flip-flops 30, 32 is in effect chained together, as shown. Further, each flip-flop in each set is connected to a square clock signal of predetermined frequency, such a clock signal being familiar in any art using shift registers. (Depending on a particular practical design of the larger apparatus, the clock signal can be generated internal to or external of each chip.) Certain outputs of a certain subset of flip-flops within each set 30, 32 are in turn connected to a set of logic gates, here collectively called "logic" 34, the specific operation of which can be determined by close examination of the Figure.

The effect of the interconnection of flip-flops and clock signal line within each set 30, 32 is that a moving window of SRIN/OE signals over time is recorded by the flip-flops, with each flip-flop corresponding to half a clock cycle. This recorded set of signals is then applied to the various gates in logic 34. If a predetermined subset of flip-flops, reflecting recent signals into the SRIN/OE line, output a predetermined configuration of signals to the logic 34, the final output of logic 34 will be an interpretation of the input signals as mandating either serial or parallel operation of the chip. The particular arrangement of gates in logic 34 in effect operates as a "pattern recognition" for an input on the SRIN/OE line. In the illustrated embodiment, set 30 and its accompanying logic is designed to detect a signal over time instructing serial operation of the chip, while set 32 is designed to detect a signal over time instructing parallel operation of the chip.

Figure 10:
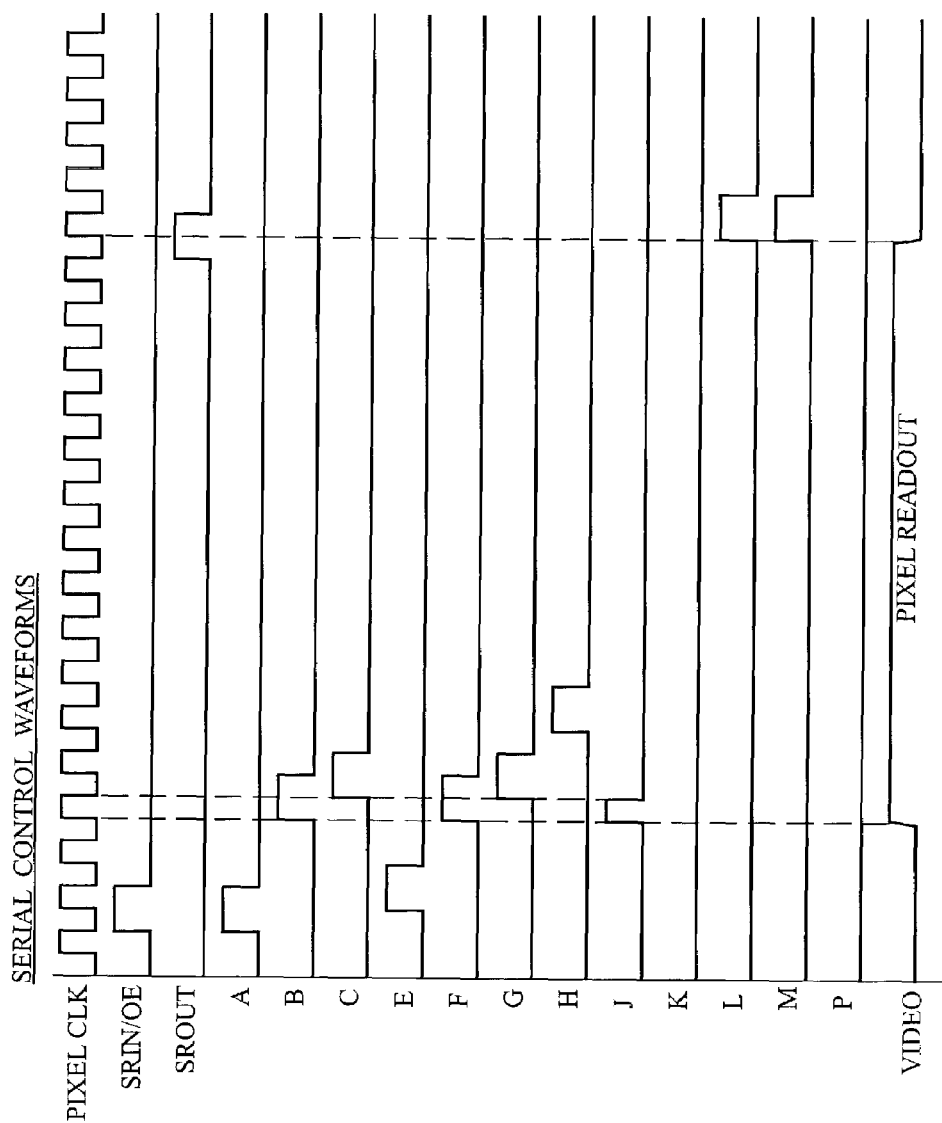
FIGS. 10 and 11 are, respectively, sets of signals over time showing the response of the circuitry in FIG. 9 for serial and parallel operation of a chip.
Figure 11:
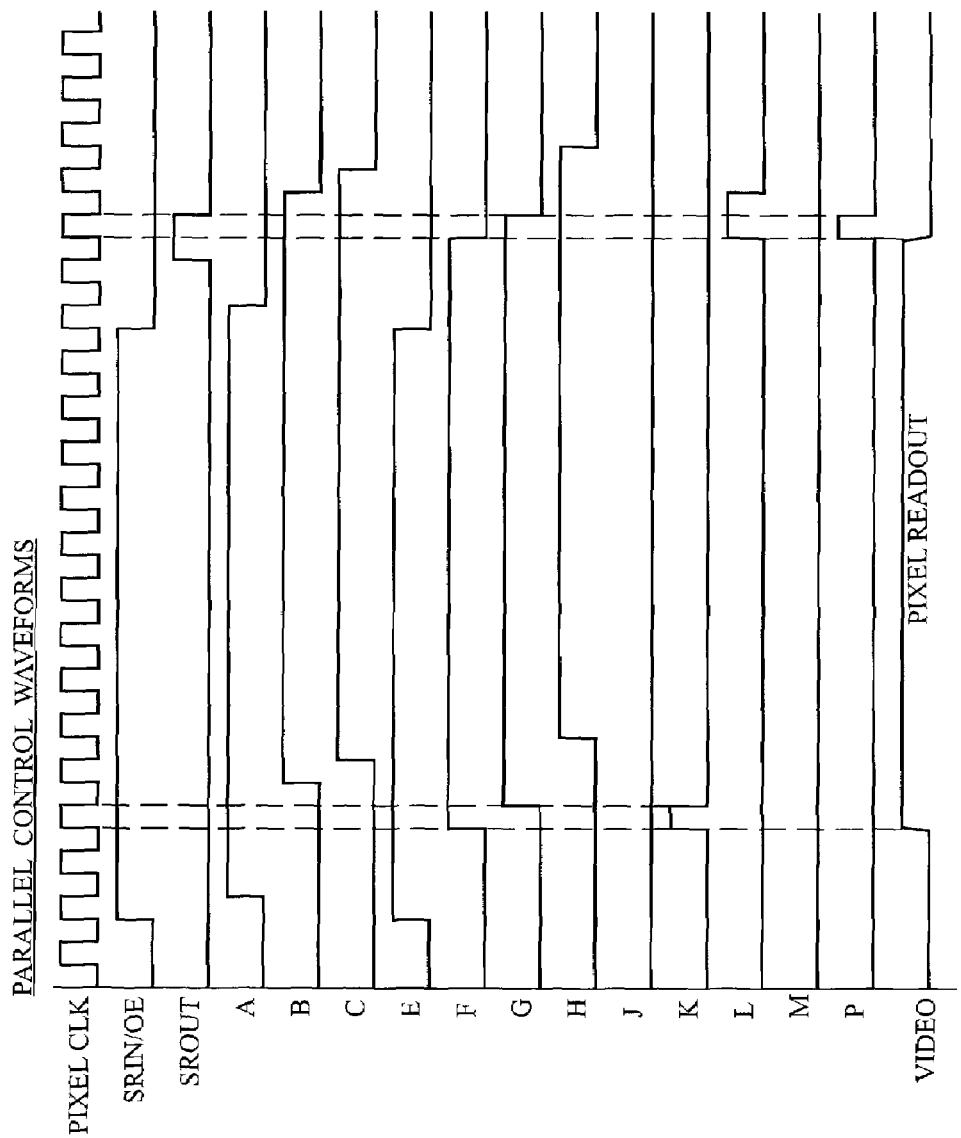

FIGS. 10 and 11 are, respectively, sets of signals over time showing the response of the circuitry in FIG. 9 for serial and parallel control of a chip. In each Figure, each signal marked A–P corresponds to a location A–P in the circuitry of FIG. 9. Comparing the two diagrams, it can be seen that the SRIN/OE signal in the serial control of FIG. 10 is a short pulse, in this case corresponding to one full clock cycle, while the SRIN/OE signal in the parallel control of FIG. 11 is longer, corresponding in this case to a number of clock cycles corresponding at least generally to the number of photosensors on the chip.

Looking closely at the illustrated embodiment, first with regard to FIG. 10 (serial control), a key characteristic is the half-cycle pulse at location J, caused by the interaction of logic gates upstream thereof in the FIG. 9 circuitry. This pulse causes the extended pulses at L and M toward the end of the readout, as shown. The L pulse is the SROUT pulse from the chip that is in turn handed off to be the SRIN/OE pulse on the subsequent chip in a serial readout, such as explained above with regard to FIG. 6.

With regard to the FIG. 11 parallel control readout, it can be seen that there is a half-cycle pulse not on the J location, as above, but rather on the K location. This pulse in turn causes there to be no pulse at location M, but instead a half-cycle pulse at location P. This pulse at P acts as a reset pulse which, when applied to the RS flip-flop 36 in FIG. 9, shuts off the parallel readout of the chip when all of the photosensors thereon are read out.

In summary, the circuitry of FIG. 9, associated with a SRIN/OE line in a chip of the general shift-register-based design of FIG. 2, recognizes input signals as being consistent with parallel or serial manner of operation, and causes the chip, which can be one chip in a larger bar or other device, to operate in the desired manner. In this way, a chip of a single basic design can be installed in a larger device intended to operate to a desired extent in a parallel or serial readout manner.

Although the present invention is described in the context of a multi-chip apparatus, the principles described and claimed herein can be applied to the operation of any set of photosensors within a larger apparatus, even if the sets of photosensors are disposed on the same chip or otherwise within any kind of larger structure. The invention can be practiced with a CMOS-based apparatus, or with a CCD device or other device in which the image signals are themselves caused to move through a shift register.

The invention claimed is:

1. A photosensitive apparatus, comprising:
a first plurality of photosensors;
a second plurality of photosensors;
an output line associated with at least the first plurality of photosensors;
a shift register line for accepting signals over time;
a shift register for causing an output of signals from the first plurality of photosensors onto the output line as a result of signals on the shift register line; and
readout control means for recognizing an instruction signal and, in response to the instruction signal being of a first predetermined type, passing a shift register signal from an output associated with the first plurality of photosensors to an output associated with the second plurality of photosensors, thereby causing the first plurality of photosensors and the second plurality of photosensors to read out in a serial manner.

2. The apparatus of claim 1, wherein the readout control means includes means for recognizing the instruction signal on the shift register line.

3. The apparatus of claim 1, further comprising means for applying a signal to circuitry associated with the second plurality of photosensors within the photosensitive apparatus when the apparatus is read out in a serial manner.

4. The apparatus of claim 3, wherein the first plurality of photosensors is disposed on a first chip and the second plurality of photosensors is disposed on a second chip.

5. The apparatus of claim 1, wherein the instruction signal is characterized by being in a high state for a predetermined duration incidental to causing the sequential output of signals.

6. The apparatus of claim 1, the readout control means including a plurality of flip-flops for retaining a signal over time on the shift register line.

7. The apparatus of claim 1, the readout control means further including at least one logic gate associated with the plurality of flip-flops for recognizing an instruction signal.

* * * * *